United States Patent
Lee

(10) Patent No.: US 7,225,310 B2
(45) Date of Patent: May 29, 2007

(54) METHOD FOR SUCCESSIVELY RECORDING DATA IN HYBRID DIGITAL RECORDER

(75) Inventor: Jong Hyun Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 246 days.

(21) Appl. No.: 11/001,997

(22) Filed: Dec. 1, 2004

(65) Prior Publication Data

US 2005/0147009 A1    Jul. 7, 2005

(30) Foreign Application Priority Data

Dec. 1, 2003    (KR)    ............... 10-2003-0086254

(51) Int. Cl.
   *G06F 12/00*    (2006.01)
(52) U.S. Cl. ............... 711/165; 386/15; 386/46; 369/84; 369/85; 711/115
(58) Field of Classification Search ............... 711/115, 711/154; 360/15, 69, 73.01; 369/30.03, 369/30.23, 53.31, 84, 85; 386/15, 46, 87, 386/92, 103, 124, 125, 126
   See application file for complete search history.

(56) References Cited

U.S. PATENT DOCUMENTS

| | | | |
|---|---|---|---|
| 6,219,309 B1 * | 4/2001 | Kuroda et al. ........... 369/30.23 |
| 6,259,859 B1 * | 7/2001 | Katsuki et al. ............. 386/104 |
| 6,292,626 B1 * | 9/2001 | Ino et al. ..................... 386/125 |
| 6,577,811 B1 * | 6/2003 | Kikuchi et al. ............... 386/98 |
| 6,937,540 B1 * | 8/2005 | Kikuchi et al. .......... 369/30.03 |
| 2002/0054350 A1 * | 5/2002 | Kakigi et al. ............... 358/1.16 |
| 2002/0172496 A1 * | 11/2002 | Gunji et al. .................. 386/46 |
| 2002/0186961 A1 * | 12/2002 | Kikuchi et al. ............... 386/98 |
| 2003/0002866 A1 * | 1/2003 | Owa et al. ................... 386/126 |

\* cited by examiner

*Primary Examiner*—Matthew Kim
*Assistant Examiner*—Michael Alsip
(74) *Attorney, Agent, or Firm*—Lee, Hong, Degerman, Kang & Schmadeka

(57) ABSTRACT

A method for successively recording data in a hybrid digital recorder. If an optical disc has no redundant area when a hybrid digital recorder in which an optical disc recorder and an HDD recorder, etc. are integrated in one body records an input data stream on the optical disc, the input data stream is temporarily stored in an HDD. If the optical disc is replaced with a new optical disc, the input data stream is temporarily stored in the HDD, and at the same time the data stream having been temporarily stored in the HDD is read and recorded on the new optical disc at a high speed. If all the data streams temporarily stored in the HDD are read and recorded on the new optical disc, the following data stream is recorded on the new optical disc. Therefore, an external input data stream such as a long-term broadcast program is distributed to a plurality of optical discs, and is stored on the optical discs without generating any lost data.

19 Claims, 4 Drawing Sheets

METHOD FOR SUCCESSIVELY RECORDING DATA IN HYBRID DIGITAL RECORDER

BACKGROUND OF THE INVENTION

1. Field of the Invention

The present invention relates to a method for successively recording data in a hybrid digital recorder, and more particularly to a method for successively recording long-term broadcast program data on a plurality of optical discs in a hybrid digital recorder in which a DVD recorder and an HDD recorder are integrated.

2. Description of the Related Art

FIG. 1 is a block diagram illustrating a conventional hybrid digital recorder. For example, a hybrid digital recorder in which a DVD recorder and an HDD recorder are integrated includes an optical disc 10, an optical pickup unit 11, a Video Disc Recording (VDR) system 12, an HDD 13, a Hard Disc Recording (HDR) system 14, a microprocessor 15, and a switch 16, etc.

The microprocessor 15 controls the HDR system 14 according to a user's request when recording an external input data stream such as a long-term broadcast program, and records the external input data stream in the HDD 13. The microprocessor 15 may also record the external input data stream on a rewritable DVD (DVD-RW) by controlling the VDR system 12. In this case, the microprocessor 15 controls the switch 16 to enter the external input data stream in the HDR system 14 and/or the VDR system 12.

For example, in the case of recording a long-term broadcast program broadcast during 3 hours on the condition that a data stream broadcast during 2 hours can be recorded on a single DVD-RW disc, a user must replace a current optical disc with a new optical disc if 2 hours has elapsed while the broadcast program is recorded on the current optical disc.

However, a predetermined time (e.g., a time of about 20 seconds and over) is required for the user to replace the current optical disc with the new optical disc, such that a broadcast program is not successively recorded and a broadcast data stream corresponding to an important scene may be lost.

In the case of recording a long-term broadcast program broadcast in real time in an HDD of a predetermined device, the recorded broadcast program can actually be reproduced by only the predetermined device, such that a user who desires to reproduce the broadcast program using another device at a predetermined location must recopy the broadcast program recorded in the HDD on an optical disc such as a DVD-RW disc, resulting in greater inconvenience of use.

SUMMARY OF THE INVENTION

Therefore, the present invention has been made in view of the above problems, and it is an object of the present invention to provide a method for dividing an external input data stream such as a long-term broadcast program into a plurality of data units, distributing the divided data units to a plurality of optical discs, and successively recording the data units on the optical discs, respectively, without generating any lost data, in a hybrid digital recorder in which a DVD recorder and the HDD recorder are integrated in one body.

In accordance with one aspect of the present invention, the above and other objects can be accomplished by a method for successively recording data in a hybrid digital recorder, comprising: recording an input data stream on a detachable recording medium; temporarily storing the input data stream in a predetermined memory when the recording medium has no redundant area in which the data stream can additionally be recorded; if the recording medium is replaced with a new recording medium, while temporarily storing the input data stream in the predetermined memory, reading the data stream temporarily stored in the memory, and recording the read data stream on the new recording medium; and recording a data stream input afterward on the new recording medium, if the data stream temporarily stored in the memory is read and recorded on the new recording medium.

In accordance with another aspect of the present invention, there is provided a hybrid digital recorder apparatus for successively recording data therein, comprising: a drive for recording an input data stream on a detachable recording medium; a memory for storing the input data stream; and a controller for controlling the drive and the memory such that it temporarily stores the input data stream in the memory when the recording medium has no redundant area in which the data stream can additionally be recorded, if the recording medium is replaced with a new recording medium, while temporarily storing the input data stream in the memory, reads the data stream temporarily stored in the memory and records the read data stream on the new recording medium, and records a data stream input afterward on the new recording medium if the data stream temporarily stored in the memory is read and recorded on the new recording medium. Preferably, the hybrid digital recorder apparatus may further include an On Screen Display (OSD) generator for generating an image including information associated with a recording state of the hybrid digital recorder apparatus, and displaying the generated image on an external display.

Preferably, a recording speed at which the data stream temporarily stored in the memory is read and recorded on the new recording medium is higher than a transfer rate of the input data stream.

Preferably, the controller calculates the remaining time during which the input data stream can additionally be recorded on the basis of a transfer rate of the input data stream and a redundant area of the recording medium, and displays the calculated remaining time on the external display.

Preferably, the controller calculates a disc replacement time on the basis of a transfer rate of the input data stream, a redundant area of the memory, and a recording speed at which the data stream temporarily stored in the memory is recorded on the new recording medium, and displays the calculated disc replacement time on the external display.

Preferably, the method may further comprise: disregarding a user-entry recording stop command or a user-entry power-off command if no data stream is input before all the data streams temporarily stored in the memory are recorded on the new recording medium, and recording all the data streams temporarily stored in the memory before being recorded on the new recording medium on the new recording medium.

Preferably, the recording medium is indicative of an optical disc, and the memory is indicative of either a Hard Disc Drive (HDD) or a detachable flash memory card and a memory card drive.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Figure 1:
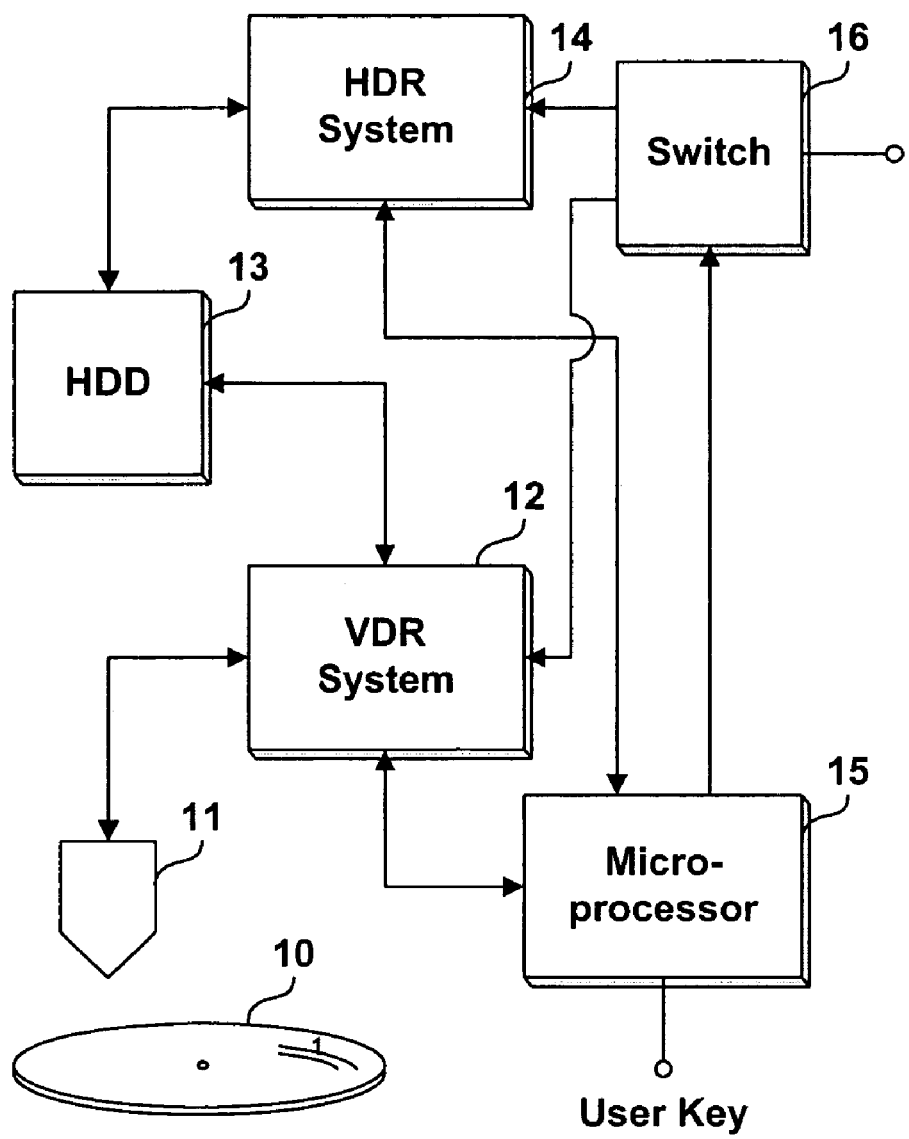
FIG. 1 is a block diagram illustrating a conventional hybrid digital recorder.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 2:
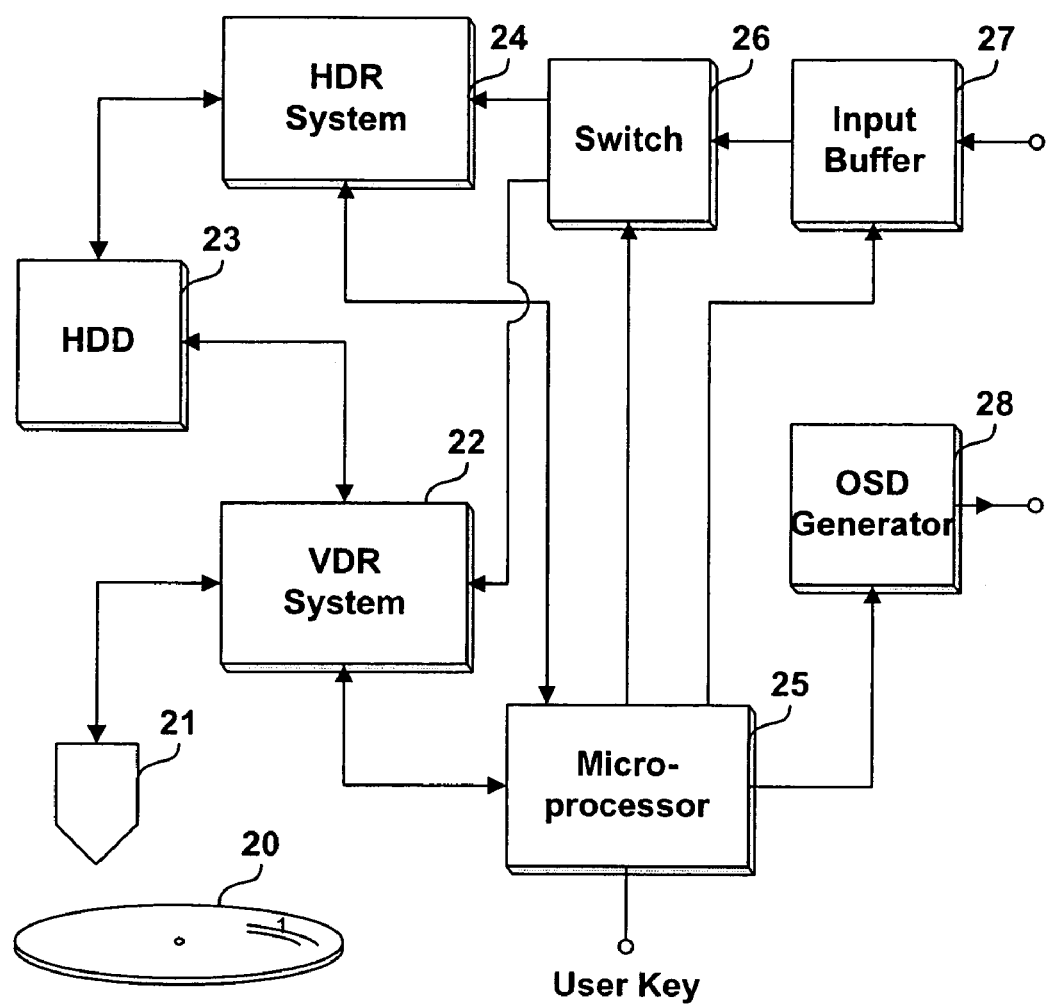
FIG. 2 is a block diagram illustrating a hybrid digital recorder according to the present invention.

FIG. 2 is a block diagram illustrating a hybrid digital recorder according to the present invention. For example, a hybrid digital recorder in which a DVD recorder and an HDD recorder are integrated includes an optical disc 20, an optical pickup unit 21, a VDR system 22, an HDD system 24, a microprocessor 25, a switch 26, and an input buffer 27, etc.

The above-mentioned hybrid digital recorder may further include an On Screen Display (OSD) generator 28. The input buffer 27 temporarily stores an external input data stream. The microprocessor 25 controls the switch 26 to enter the data stream temporarily stored in the input buffer 27 in the VDR system 22 or the HDR system 24.

The microprocessor 25 controls the VDR system 22 upon receipt of a request from a user, and records the external input data stream (e.g., a broadcast program) temporarily stored in the input buffer 27 on the optical disc 20. In this case, if the optical disc 20 is full of data due to the long-term broadcast program, the microprocessor 25 uses the HDD 23 as a large-capacity buffer, such that it performs a successive data recording operation in which the long-term broadcast program is successively recorded on a plurality of optical discs without generating any lost data.

Figure 3:
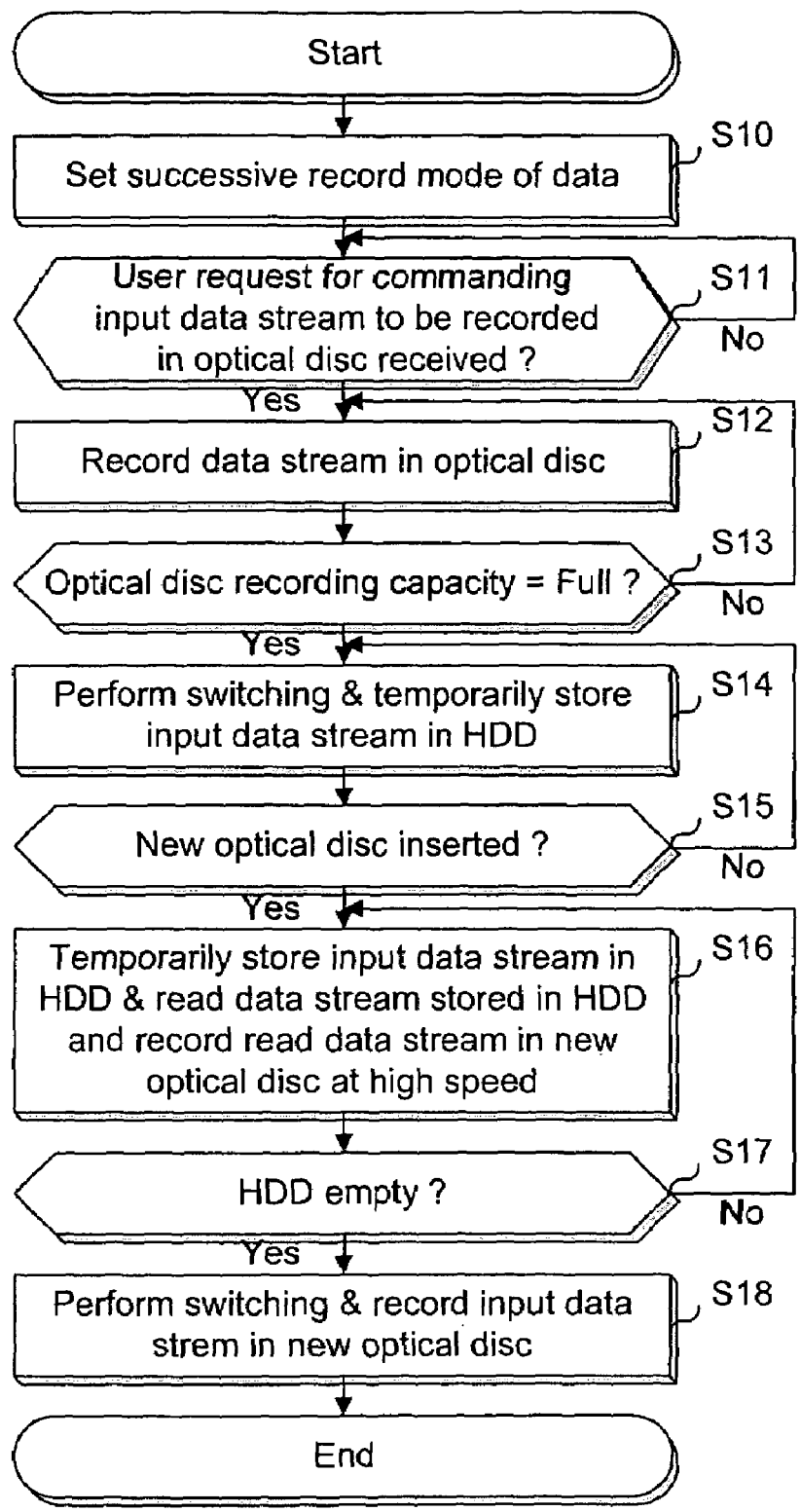
FIG. 3 is a flow chart illustrating a method for successively recording data in a hybrid digital recorder according to the present invention.

FIG. 3 is a flow chart illustrating a method for successively recording data in a hybrid digital recorder according to the present invention. Referring to FIG. 3, the microprocessor 25 establishes a successive record mode of data according to a user request signal at step S10, and determines whether a user request for commanding the external input data stream such as a broadcast program to be recorded on an optical disc such as a DVD-RW disc is received at step S11. Upon receipt of the above-mentioned user request, the microprocessor 25 controls the switch 26 to enter the external input data stream temporarily stored in the input buffer 27 in the VDR system 12.

The VDR system 22 performs signal processing of converting the above-mentioned external input data stream into a signal suitable for a recording operation, such that it records the signal-processed data stream on the optical disc 20 at step S12. The microprocessor 25 determines whether a recording capacity of the optical disc 20 is full of data at step S13.

If it is determined that the recording capacity of the optical disc is full of data at step S13, the microprocessor 25 controls the switch 25 to enter the external input data stream temporarily stored in the input buffer 27 in the HDR system, and at the same time controls the HDR system 24 to allow the HDD 23 to act as a large-capacity buffer, such that the above-mentioned input data stream is temporarily stored in a specific area of the HDD 23 at step S14.

Thereafter, the microprocessor 25 determines whether a user replaces a current optical disc with a new optical disc at step S15. In the case where the new optical disc (e.g., Disc 2) is inserted into the hybrid digital recorder and is completely loaded on the same, the microprocessor 25 maintains a current switching state of the switch 26 to enter the external input data stream temporarily stored in the input buffer 27 in the HDR system 24. Also, the microprocessor 25 controls the HDR system 24 such that it successively and temporarily stores the above-mentioned input data stream in the HDD 23. Further, the microprocessor 25 controls the VDR system 22 to read a data stream stored in the HDD 23, and records the read data stream on the new optical disc (i.e., Disc 2) at a high speed at step S16.

Figure 4:
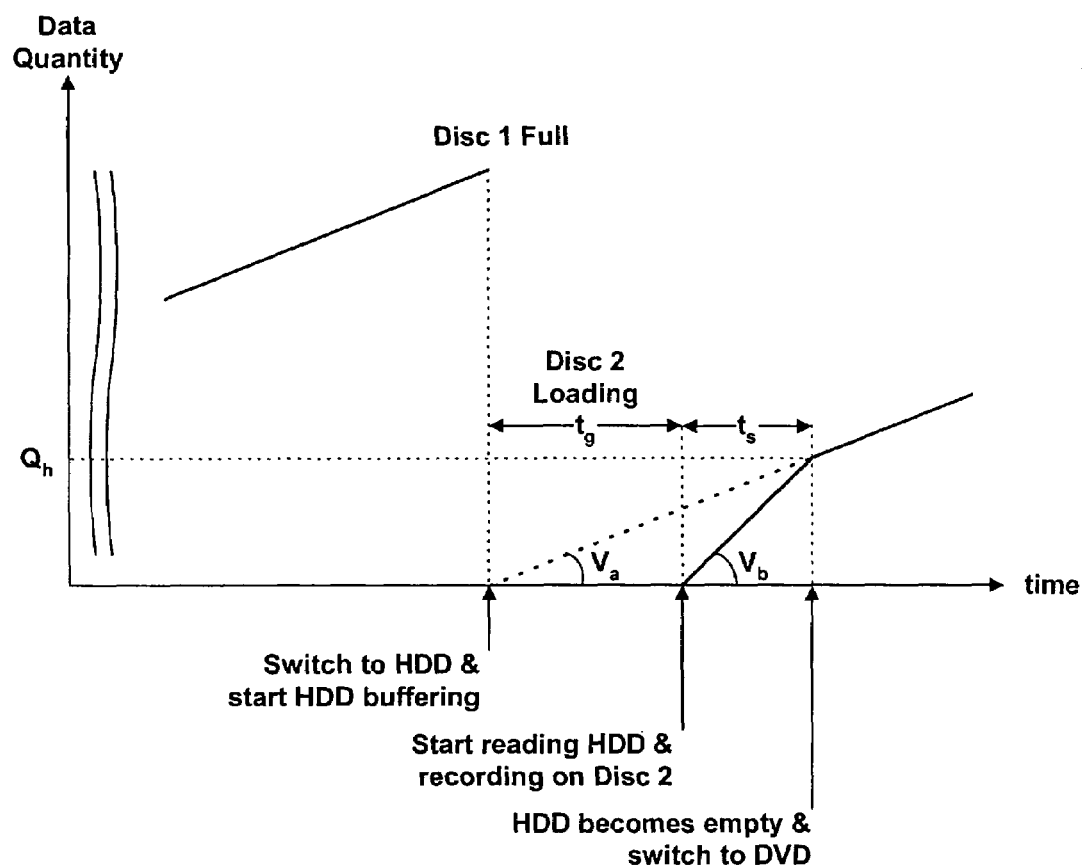
FIG. 4 is an exemplary graph illustrating a method for recording data on an optical disc or HDD.

In this case, a data recording speed of the optical disc must be higher than an HDD recording speed, i.e., a transfer rate of the external input data stream, as shown in FIG. 4. Therefore, it is preferable that the data recording speed of the optical disc is determined to be a maximum speed at which the VDR system 22 and the new optical disc (i.e., Disc 2) can stably record desired data thereon.

In the meantime, the microprocessor 25 performs a temporary storage operation of the HDD 23 and a high-speed recording operation for the new optical disc, and at the same time monitors whether the external input data stream temporarily stored in the HDD 23 is completely read or not at step S17. In this case, a transfer rate $V_a$ of the external input data stream, a time $t_g$ taken to insert the new optical disc (Disc 2) into the hybrid digital recorder and complete a initial loading operation of the inserted optical disc after a recording capacity of the optical disc 20 has entered a full state, a recording speed $V_b$ at which the data stream temporarily stored in the HDD 23 is recorded on the new optical disc (Disc 2), and a time $t_s$ during which all the data streams temporarily stored in the HDD 23 are read and completely recorded on the new optical disc (Disc 2) after replacing a current optical disc with the new optical disc (Disc 2) satisfy the following equation $V_a \times (t_g + t_s) = V_b \times t_s$, such that the resultant value of $t_s$ is determined to be $$t_s = \frac{V_a}{(V_b - V_a)} \times t_g.$$

If all the data streams temporarily stored in the HDD 23 are read, the microprocessor 25 controls the switch 26 to enter the external input data stream temporarily stored in the input buffer 27 in the VDR system 22, and directly records the above-mentioned input data stream on the new optical disc without using the HDD 23 at step S18. In this case, there is no need for a recording speed of the optical disc to be equal to a high speed, and it is preferable that the recording speed of the optical disc is determined to be a transfer rate of the external input data stream.

In the meantime, the microprocessor 25 records the input data stream on the optical disc 20 by controlling the VDR system 22, and at the same time calculates the remaining time during which the above-mentioned input data stream can additionally be recorded on the optical disc 20. The microprocessor 25 calculates the remaining time on the basis of a transfer rate of the input data stream and a redundant area of the optical disc 20. The microprocessor 25 controls the OSD generator 28 to generate caption data including the calculated remaining time and display the caption data on a screen of a display such as a TV, such that the user can perform a disc replacement preparation for replacing a current optical disc with the new optical disc.

Provided that a predetermined recording capacity of the optical disc 20 is full of data on the condition that the redundant area of the HDD 23 is insufficient, and a user does not rapidly replace a current optical disc with the new optical disc, the input data stream is not successively recorded on the new optical disc and some parts thereof may be unavoidably lost. To reduce the probability of the above-mentioned problems, the microprocessor 25 calculates a predetermined time at which the user must replace the current optical disc with the new optical disc after the recording capacity of the current optical disc is full of data, and displays the calculated time on a TV screen, such that the user can previously recognize the predetermined time before the recording capacity of the current optical disc is full of data.

The microprocessor 25 can calculate a disc replacement time $t_g$ on the basis of a transfer rate $V_a$ of the input data stream, a redundant area $Q_h$ of the HDD 23, and a recording speed $V_b$ at which the data stream temporarily stored in the HDD 23 is recorded on the optical disc to be replaced with the new one. In FIG. 4, the redundant area $Q_h$ of the HDD 23 is represented by $Q_h = V_b \times t_s$, and the time of $t_s$ during which all the data streams temporarily stored in the HDD 23 are read and completely recorded on the new optical disc after replacing the current optical disc with the new optical disc is represented by $$t_s = \frac{V_a}{(V_b - V_a)} \times t_g,$$

such that the disc replacement time $t_g$ can be represented by $$t_g = \frac{(V_b - V_a)}{V_a \times V_b} \times Q_h.$$

In this case, the microprocessor 25 displays a value less than the calculated disc replacement time $t_g$ in consideration of a time required for initial operations, such as servo and Optical recording Power Calibration (OPC) operations, to be performed after the new optical disc is inserted into an optical disc drive.

In the meantime, if the broadcasting of a broadcast program is terminated before all the data streams temporarily stored in the HDD 23 are recorded on the new optical disc, the user determines that the recording of the broadcast program is terminated, such that the user may stop the recording operation of the hybrid digital recorder or may power off the hybrid digital recorder. In order to prevent the user from stopping the recording operation of the hybrid digital recorder or from powering off the hybrid digital recorder, the microprocessor 25 disregards the user-entry recording stop command or the user-entry power-off command, and records all the data streams ($Q_r$) temporarily stored in the HDD 23 without being recorded on the new optical disc on the new optical disc during a predetermined time of $t_r = Q_r/V_b$. Thereafter, the microprocessor 25 may stop the recording operation of the hybrid digital recorder, or may power off the hybrid digital recorder.

The above-mentioned method for successively recording data according to the present invention is applicable to a variety of hybrid devices other than the above-mentioned hybrid digital recorder. In other words, the hybrid digital recorder shown in FIG. 2 may also be indicative of a detachable flash memory card (e.g., a Security Digital (SD) card, a Compact Flash (CF) card, or Memory Stick, etc.) and a memory card drive for reading data from the flash memory or recording data in the flash memory.

As apparent from the above description, the present invention can efficiently record a long-term broadcast program such as a broadcast data stream on a plurality of optical discs in a successive manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for successively recording data in a hybrid digital recorder, comprising:
    a) recording an input data stream on a detachable recording medium;
    b) temporarily storing the input data stream in a memory when the recording medium has no remaining space for recording the input data stream;
    c) replacing the recording medium with a new recording medium when the recording medium has no remaining space, reading the data stream temporarily stored in the memory, and recording the stored data stream on the new recording medium while temporarily storing the input data stream in the memory; and
    d) recording the input data stream on the new recording medium when the stored data stream has been completely recorded on the new recording medium,
    wherein a time for recording the stored data stream on the new recording medium is $$t_g = \frac{(V_b - V_a)}{V_a \times V_b} \times Q_h,$$

where $V_a$ is a transfer rate of the input data stream, $V_b$ is a recording rate at which the stored data stream is recorded on the new recording medium, $t_g$ is the time to replace the recording medium with the new recording medium, and $V_b$ is greater than $V_a$.

2. The method according to claim 1, wherein the step a) further includes:
    displaying a remaining time during which the input data stream can additionally be recorded on the recording medium on an external display.

3. The method according to claim 2, wherein the remaining time is calculated based upon a transfer rate of the input data stream and a remaining space of the recording medium.

4. The method according to claim 1, wherein the step b) further includes:

displaying a time on an external display during which the recording medium must be replaced with the new recording medium.

5. The method according to claim 4, wherein the disc replacement time $t_g$ is calculated based upon a transfer rate of the input data stream, a free space of the memory for storing the input data stream, and a recording speed at which the stored data stream is recorded on the new recording medium.

6. The method according to claim 5, wherein the recording speed at which the stored data stream is read and recorded on the new recording medium is greater than a transfer rate of the input data stream.

7. The method according to claim 6, wherein the disc replacement time $t_g$ is $$t_s = \frac{V_a}{(V_b - V_a)} \times t_g,$$

where $V_a$ is a transfer rate of the input data stream, $V_b$ is a recording speed at which the stored data stream is recorded on the new recording medium, and $Q_h$ is the free space of the memory.

8. The method according to claim 1, further comprising:
disregarding a user-entry recording stop command or a user-entry power-off command if no data stream is input before all the data streams temporarily stored in the memory are recorded on the new recording medium, and recording all the stored data streams without being recorded on the new recording medium.

9. The method according to claim 1, wherein the recording medium is an optical disc.

10. The method according to claim 1, wherein the memory is a Hard Disc Drive (HDD).

11. The method according to claim 1, wherein the memory is a detachable flash memory card and a memory card drive.

12. The method according to claim 11, wherein the detachable flash memory card is at least one of a Security Digital (SD) card, a Compact Flash (CF) card, and Memory Stick.

13. A hybrid digital recorder apparatus for successively recording data therein, comprising:
a recorder for recording an input data stream on a detachable recording medium;
a memory for storing the input data stream; and
a controller for controlling the recorder and the memory such that the input data stream is stored in the memory when the recording medium has no remaining space for recording the data stream, reading the stored data stream and recording the stored data stream on a new recording medium, and recording the input data stream the new recording medium, and recording the input data stream on the new recording medium when the stored data stream has been completely recorded on the new recording medium,
wherein a time for recording the stored data stream on the new recording medium is $$t_s = \frac{V_a}{(V_b - V_a)} \times t_g,$$

where $V_a$ is a transfer rate of the input data stream, $V_b$ is a recording rate at which the stored data stream is recorded on the new recording medium, $t_g$ is the time to replace the recording medium with the new recording medium, and $V_b$ is greater than $V_a$.

14. The apparatus according to claim 13, further comprising:
an On Screen Display (OSD) generator for displaying a recording state of the hybrid digital recorder apparatus an external display.

15. The apparatus according to claim 14, wherein:
the controller calculates the remaining time during which the input data stream can be recorded based upon a transfer rate of the input data stream and the remaining space of the recording medium, and
the OSD generator displays the remaining time on the external display.

16. The apparatus according to claim 14, wherein:
the controller calculates a time for replacing the recording medium based upon a transfer rate of the input data stream, a free space of the memory for storing the input data stream, and a recording speed at which the stored data stream is recorded on the new recording medium, and
the OSD generator displays the recording medium replacement time on the external display.

17. The apparatus according to claim 13, wherein:
the controller controls the recorder and the memory, such that a recording speed at which the stored data stream is read and recorded on the new recording medium is greater than a transfer rate of the input data stream.

18. The apparatus according to claim 13, wherein:
the controller controls the recorder and the memory, such that a user-entry recording stop command or a user-entry power-off command is disregarded if no data stream is input before all the stored data streams are recorded on the new recording medium, and all the stored data streams without being recorded on the new recording medium are recorded on the new recording medium.

19. The apparatus according to claim 13, wherein:
the recording medium an optical disc, and the memory is either a Hard Disc Drive (HDD) or a detachable flash memory card and a memory card drive.

* * * * *